United States Patent
Kida et al.

(10) Patent No.: US 7,281,696 B2
(45) Date of Patent: Oct. 16, 2007

(54) MOUNTING FITTING

(75) Inventors: Yuji Kida, Yokkaichi (JP); Yoshinao Kobayashi, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 78 days.

(21) Appl. No.: 11/285,456

(22) Filed: Nov. 22, 2005

(65) Prior Publication Data

US 2006/0110961 A1    May 25, 2006

(30) Foreign Application Priority Data

Nov. 24, 2004    (JP)    ............... 2004-339085

(51) Int. Cl.
  *A47F 5/00*    (2006.01)
(52) U.S. Cl. ..................... 248/300; 248/903
(58) Field of Classification Search ................ 248/300, 248/220.1, 220.21, 49, 65, 903; 403/187, 403/189
See application file for complete search history.

(56) References Cited

U.S. PATENT DOCUMENTS

| | | | | |
|---|---|---|---|---|
| 3,627,248 A | * | 12/1971 | Nelson | ................... 248/309.1 |
| 4,313,587 A | | 2/1982 | Loeschen | |
| 5,577,695 A | * | 11/1996 | Ruckwardt | ................... 248/200 |
| 6,254,039 B1 | * | 7/2001 | Zimmerman | ................ 248/48.2 |
| 6,669,156 B2 | * | 12/2003 | East et al. | ................... 248/300 |
| 2002/0145095 A1 | * | 10/2002 | Winkler | ....................... 248/300 |
| 2002/0151213 A1 | | 10/2002 | Aoki et al. | |
| 2003/0184118 A1 | | 10/2003 | Sano et al. | |
| 2004/0094681 A1 | * | 5/2004 | Birnbaum | ................... 248/300 |

FOREIGN PATENT DOCUMENTS

| | | |
|---|---|---|
| JP | 11-348683 | 12/1999 |
| JP | 2003-232084 | 8/2003 |

* cited by examiner

*Primary Examiner*—Ramon O Ramirez
(74) *Attorney, Agent, or Firm*—Gerald E. Hespos; Anthony J. Casella

(57) ABSTRACT

A mounting fitting (3, 5) is made of a metallic plate material, wherein a first mounting panel (7, 14) to be mounted on a casing (1) is defined on one surface, and a second mounting panel (8, 16) to be mounted on an inner panel (2) is defined on the opposite surface. A reinforcing edge (12, 18) is formed by bending at a peripheral edge portion of the mounting fitting (3, 5) such that an edge end thereof faces in the same direction. The reinforcing edge (12, 18) is continuous along the longitudinal direction thereof without any cut.

18 Claims, 5 Drawing Sheets

MOUNTING FITTING

BACKGROUND OF THE INVENTION

1. Field of the Invention

The present invention relates to a mounting fitting.

2. Description of the Related Art

Japanese Unexamined Patent Publication No. 2003-232084 discloses a metallic mounting fitting for fixing an object to a fixed member. The mounting fittings are formed by press-working metallic plate materials and often must have a high strength. Strength can be enhanced by bending or embossing the metallic plate to form a reinforcement.

The fitting is bent at about 90°, and two objects are mounted fixed at the opposite ends. A reinforcing rib extends over substantially the entire length of one surface to achieve a high strength. However, the reinforcing rib can be formed over the entire length in this way only because the surfaces of the fitting that will be fixed to the objects are on only one surface of the fitting. A problem arises if both surfaces of the fitting are mounting surfaces.

FIG. 5 shows a fitting 5 with mounting surfaces 22, 24 on the front side of one end and on the rear side of the other end. The mounting surface 24 at the foreside of FIG. 5 is on the rear surface of the fitting 5, whereas the mounting surface 22 at the backside is on the front surface of the fitting 5. Accordingly, bending directions of the reinforcing edges 25A, 25B must be changed for the respective mounting surfaces 22, 24 to enable mounting without any interference with reinforcing edges 25A, 25B. Accordingly, the reinforcing edges 25A, 25B are divided between the two mounting surfaces 22, 24 and are not be continuous with each other. This design may not be sufficiently strong.

The present invention was developed in view of the above problem, and an object thereof is to enhance the strength of a mounting fitting.

SUMMARY OF THE INVENTION

The invention relates to a mounting fitting formed by bending a metallic plate material and used to make an object, such as a casing for accommodating wiring for a sliding door that is to be mounted fixedly to a fixed member, such as a panel. The mounting fitting has first and second mounting panels that are displaced from one another. The first mounting panel is for opposing and mounting on the object to be mounted. The second mounting panel is for opposing and mounting on the fixed member. Reinforcing flanges are bent so that edge ends thereof face substantially in the same direction and on the same side along the longitudinal direction thereof. The reinforcing flanges are at the opposite lateral edges extending from the first mounting panel to the second mounting panel and are substantially continuous along the longitudinal direction without any cut. Thus, the strength of the mounting fitting is improved as compared to conventional ones.

The reinforcing flanges preferably are formed at the opposite lateral edges extending from the first mounting panel to the second mounting panel and at least ends of the lateral edges at one side are connected by a U-shaped curved portion. Accordingly, a long range is ensured for the continuous reinforcing flange and reinforcement is improved.

One of the mounting panels preferably is struck to bulge out in substantially the same direction as the facing direction of the edge of the reinforcing flange to form a step at a boundary between the two mounting panels. The struck surface is at a position having substantially the same height as the edge end on the struck surface or projects slightly more outward. Accordingly, there is no interference with the reinforcing flange even if both mounting surfaces are opposed to and brought into contact with the object to be mounted and the fixed member. Thus, the mounting fitting is applicable even if the object to be mounted and the fixed member are wide.

One or more substantially U-shaped grooves preferably are formed between the opposite lateral ends of a first mounting panel and the reinforcing flange upon bending the second mounting panel with respect to the first mounting panel to form a step.

An end of the reinforcing flange preferably is substantially at the same height as one mounting surface.

Longitudinal ribs preferably are on the first and/or the second mounting flange. The ribs preferably are in an intermediate position of a range extending from a step to one of the first and second mounting surfaces and sides of mounting holes in the other mounting panels.

The rib in the middle and/or the ribs at the sides preferably project in substantially opposite directions.

The rib in the middle extends over one of the steps between the second mounting panel and an inclined step and between the first mounting panel and the inclined step, respectively, while the ribs at the sides of the rib in the middle extend over the other of the steps.

The mounting fitting may further comprise at least one embossment at steps between one of the first and second mounting panels and an inclined step between the first and second mounting panels.

The mounting fitting preferably is positioned at one or more distal ends of the object to be mounted.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Mounting fittings according to the invention are used for a power feeding device for a slide door of an automotive vehicle. Specifically, wiring for feeding power to electrical components of the door must be laid between the slide door of the automotive vehicle and a vehicle body. Thus, a casing 1 for accommodating the wiring for the door is incorporated into the door. The casing 1 has two long opposed plates made of a metal (aluminum alloy) and/or of a composite material, and wires, connectors, electric circuits and the like are accommodated in a space between the plates. Connectors are joined with ends of the wires and are electrically connectable with electrical components (e.g. a motor for moving a door glass up and down) in the door. The casing 1 is fixed to a lower part of a door inner panel 2 by mounting fittings preferably made of the same material as the casing 1.

The casing 1 receives a relatively large force, such as a pulling force, from a wire laying portion of the vehicle body when the door is opened or closed. The respective mounting fittings must have a sufficient strength against this force. In this embodiment, a conventional mounting fitting 5 is arranged in an intermediate position, and the technology of the invention is applied to mounting fittings 3, 4 arranged at the opposite ends.

Figure 1:
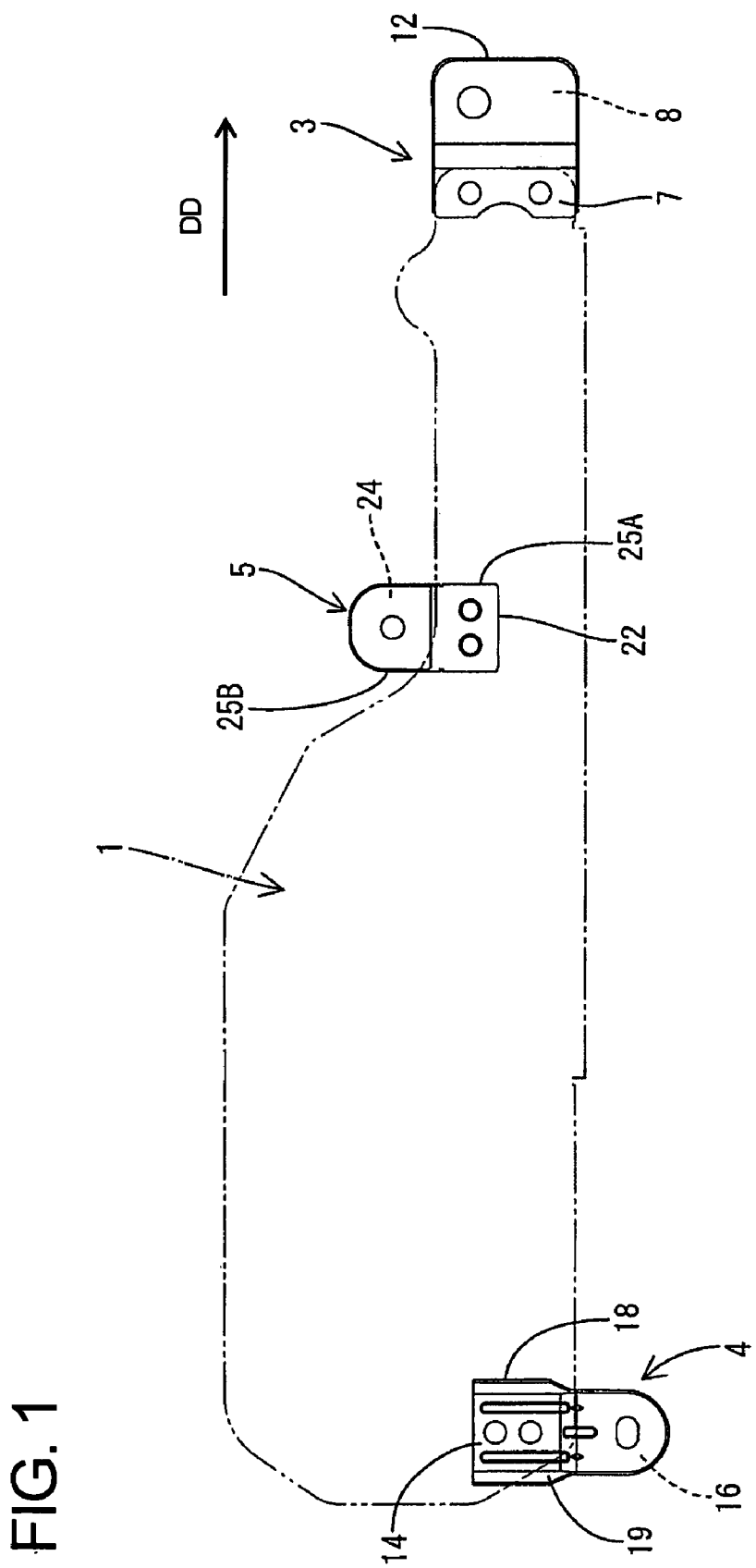
FIG. 1 is a front view showing a state where mounting fittings are mounted on a casing for a slide door.
Figure 2:
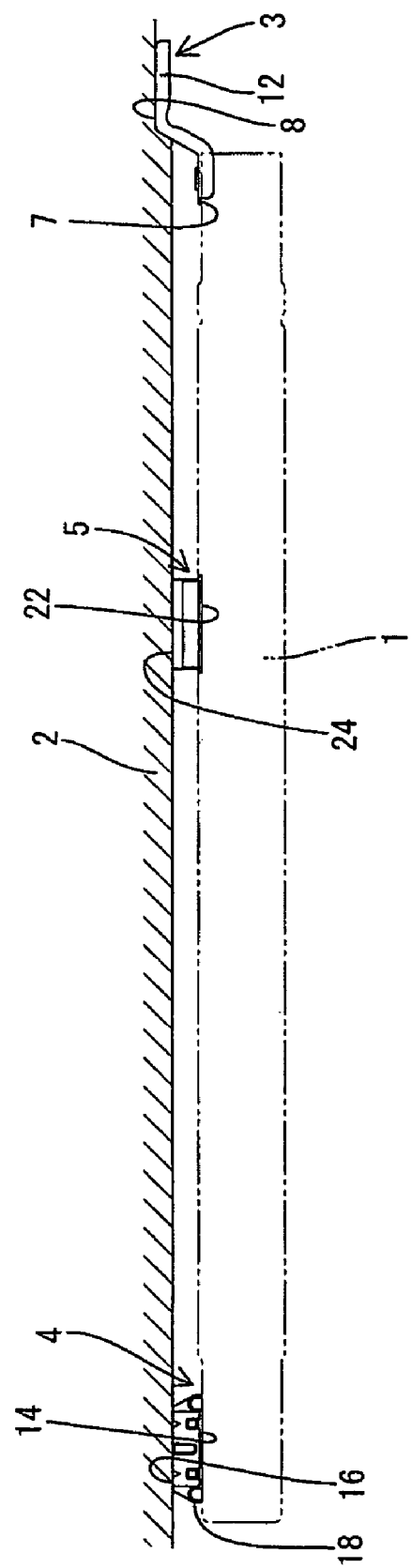
FIG. 2 is a side view showing mounted states of the mounting fittings on the door.
Figure 3:
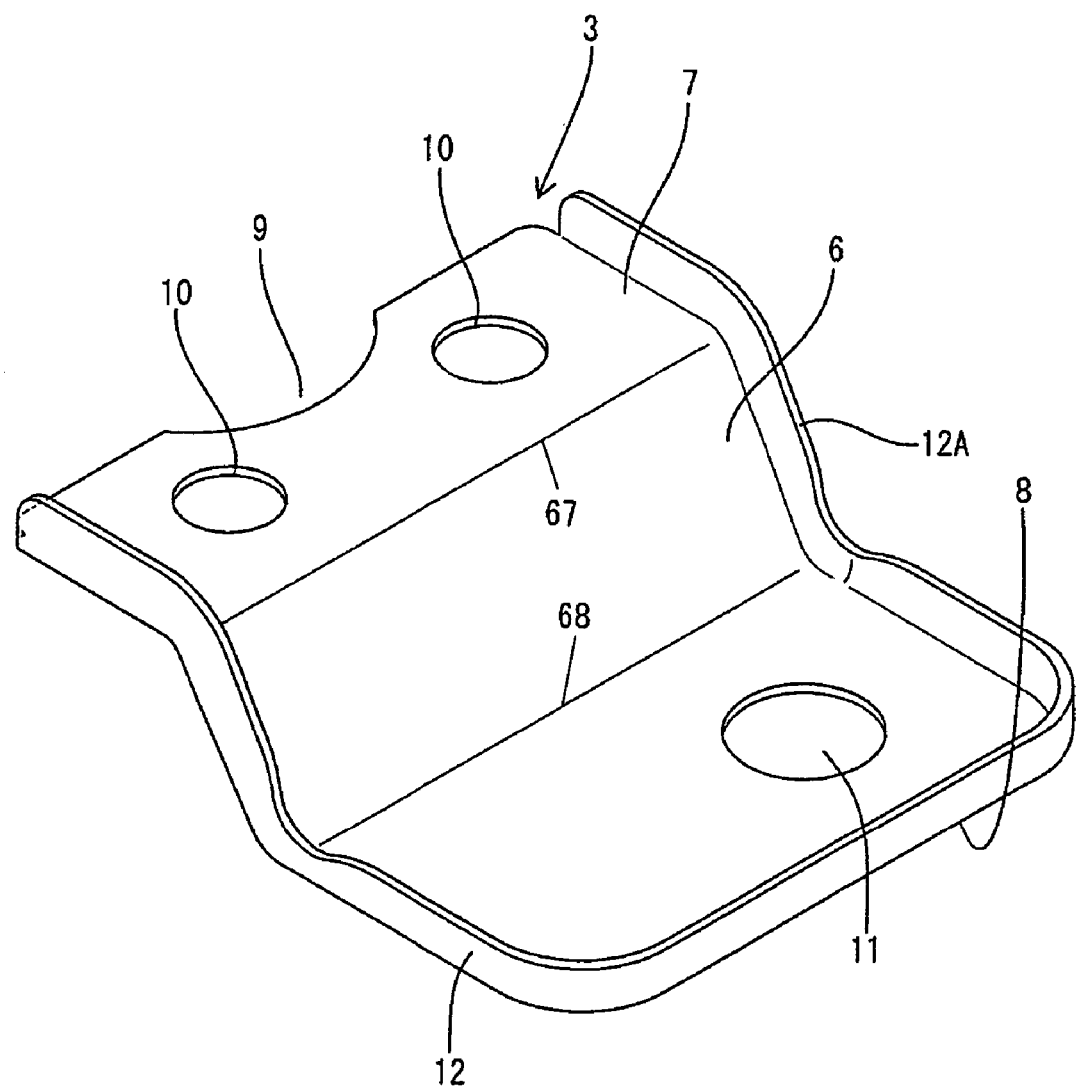
FIG. 3 is a perspective view of the front mounting fitting.

The front mounting fitting 3 is at the front side with respect to a driving direction DD of the vehicle shown in FIG. 1 and bulges out forward as shown in FIG. 3. The front mounting fitting 3 is formed from a substantially rectangular plate and has an inclined stepping panel 6 substantially in the middle. A first mounting panel 7 is joined unitarily to the stepping panel 6 by a first bend line 67. The top surface of the first mounting panel 7 shown in FIG. 3 is to be opposed to and mounted on the surface of the casing 1 facing the inner panel 2. The second mounting panel 8 (rear surface in FIG. 3) is joined unitarily to the stepping panel 6 along a second bend line 68 that is substantially parallel to the first bend line 67. Thus, the second bending panel 8 is on the side of the stepping panel 6 opposite the first mounting panel 7. The second mounting panel 8 is substantially parallel to and offset from the first mounting surface 7 and is to be opposed to and mounted on the inner panel 2.

An arcuate or bent escaping recess 9 is formed substantially in the widthwise middle of the lateral edge of the first mounting panel 7 opposite the first bend line 67, and crimping holes 10 are formed at the substantially opposite sides of the escaping recess 9. Burring tubes project from the casing 1 and fit loosely into the crimping holes 10. The burring tubes then are crimped, deformed, bent or folded to fix the front mounting fitting 3.

The corners of the second mounting panel 8 opposite the second bend line 68 are arcuate, and a bolt hole 11 is formed at a position slightly displaced to one side. The bolt hole 11 is used to mount the bottom surface of the second mounting panel 8 on the inner panel 2. A reinforcing flange 12 is bent at a substantially right angle on substantially the entire periphery of the front mounting fitting 3 except the edge with the escaping recess 9. The reinforcing flange 12 is bent so that an edge 12A faces substantially away from the door inner panel 2 (up in FIG. 3). Additionally, the edge 12A of the reinforcing flange 12 is substantially continuous without any cut over the entire length. In this embodiment, an end portion of the casing 1 can be held tightly held between parts of the reinforcing flange 12 at positions of the first mounting panel 7 facing along the width direction.

Figure 4:
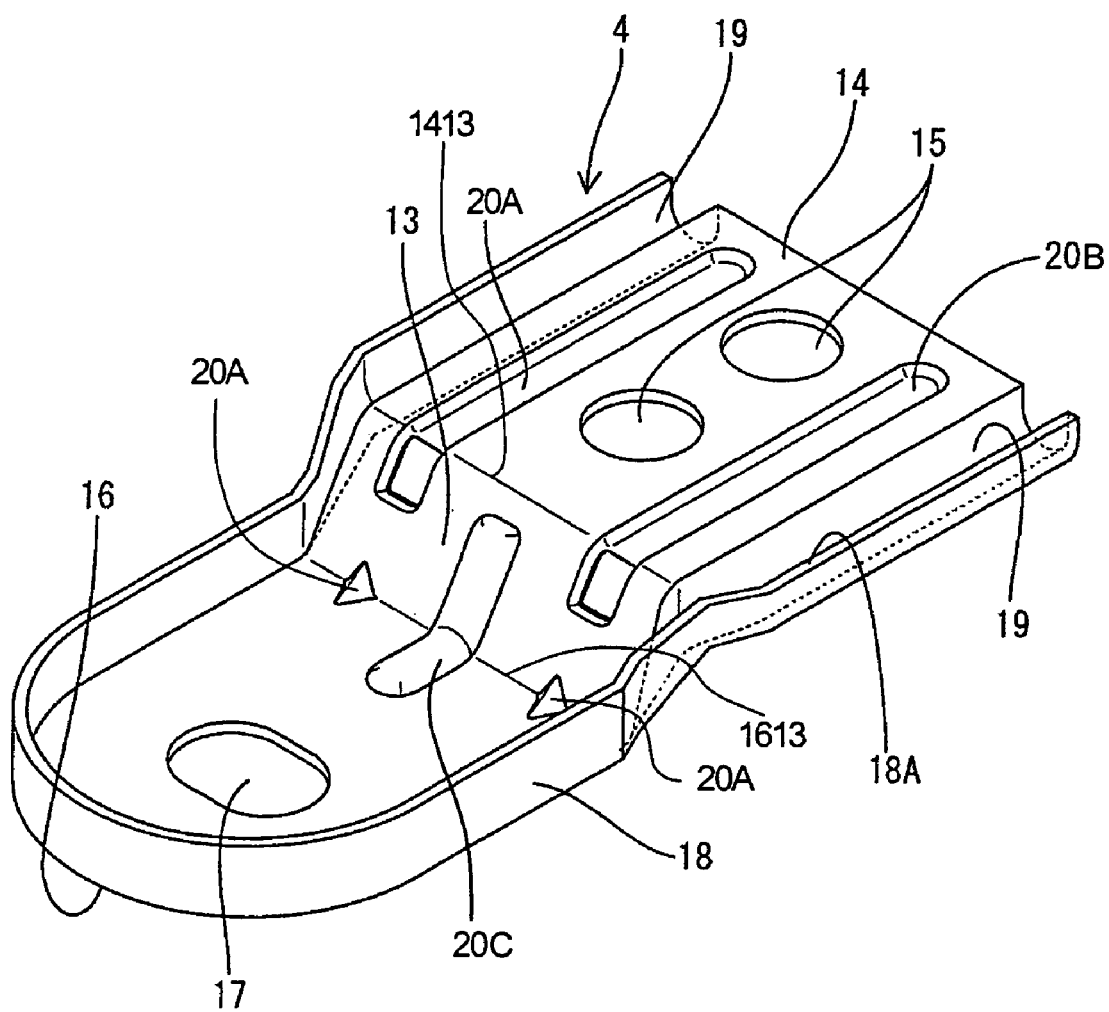
FIG. 4 is a perspective view of the rear mounting fitting.
Figure 5:
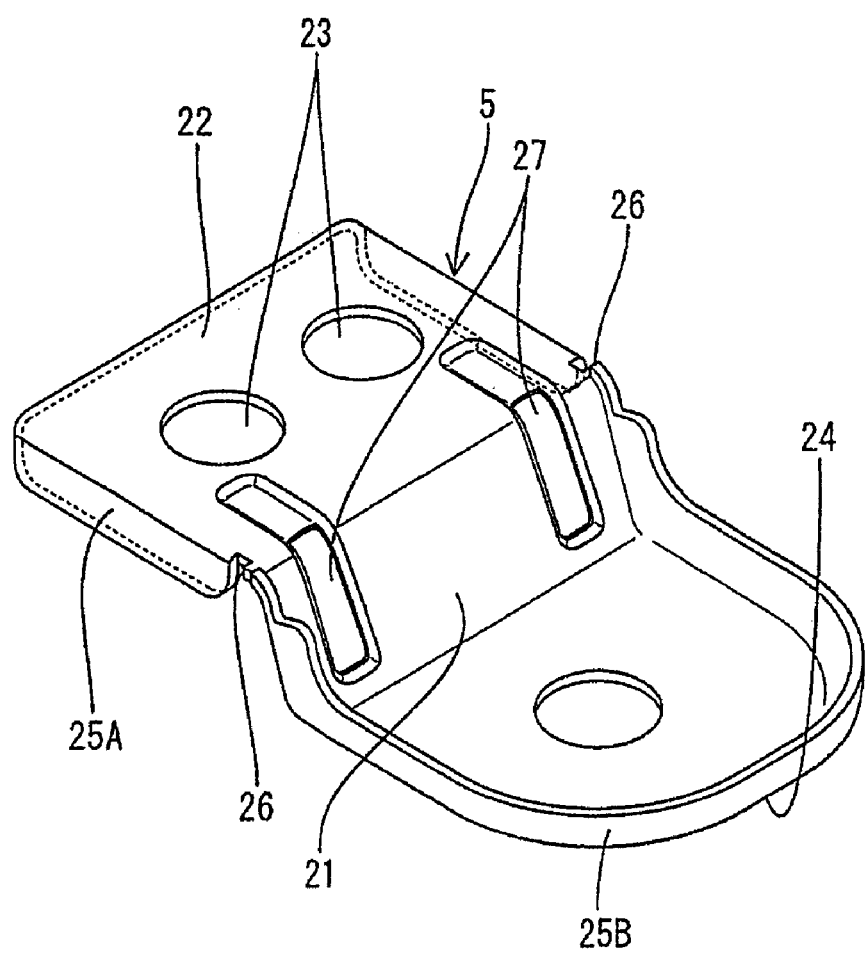
FIG. 5 is a perspective view of the middle mounting fitting.

The rear mounting fitting 4 is arranged at the rear end of the slide door with respect to a driving direction DD of the vehicle. The rear mounting fitting 4 is mounted to bulge down at the rear end of the casing 1. The rear mounting fitting 4 has an inclined stepping panel 13 substantially in the middle. A first mounting panel 14 is defined on an upper part of the rear mounting fitting 4 in FIG. 1 and is joined unitarily to the stepping panel 13 along a first bend line 1413. The surface of the first mounting panel 14 facing up in FIG. 4 will oppose the casing 1 when the rear mounting fitting 4 is mounted on the casing 1. Two crimping holes 15 are formed substantially side by side along the longitudinal direction in the first mounting panel 14. On the other hand, burring tubes (not shown) corresponding to these crimping holes 15 project from the casing 1 for mounting the rear mounting fitting 4 by a method similar to the method for mounting the front mounting fitting 3.

A second mounting panel 16 is defined at the lower part of the front mounting fitting 4 bulging out from the casing 1 and is joined unitarily to the stepping panel 13 along a second bend line 1613 that is substantially parallel to the first bend line 1413. Thus, the first and second mounting panels 14 and 16 are substantially parallel but offset. The surface of the second mounting panel 16 facing down in FIG. 4 will oppose and mount on the inner panel 2. The end of the second mounting panel 16 opposite the second bend line 1613 has a semicircular arch-like shape, and a bolt insertion hole 17 is formed substantially in the middle of the second mounting panel 16. The bolt insertion hole 17 is oblong in the direction parallel to the second bend line 1613. A reinforcing flange 18 is formed substantially continuously without any cut at the outer periphery of the second mounting panel 16 along the opposite ends of the stepping panel 13 and further along the opposite ends of the first mounting panel 14. An edge 18A extends longitudinally along the reinforcing flange 18 and faces the casing 1 (up in FIG. 4). The reinforcing flange 18 is bent at the periphery of the second mounting panel 16 substantially at a right angle towards the casing 1 in a range around the second mounting panel 16 and extending between opposite ends of the second bend line 1613. However, the reinforcing flange 18 is bent in a U-shape in ranges corresponding to the opposite lateral ends of the first mounting panel 14 facing each other and extending from the opposite ends of the first bend line 1413. In other words, U-shaped grooves 19 are formed between the reinforcing flange 18 and the opposite ends of the first mounting panel 14. The U-shaped grooves 19 extend from opposite ends of the first bend line 1413 and have their concave side facing up in FIG. 4. The U-shaped grooves 19 taper gradually to shallower depths from the first bend line 1413 to the second bend line 1613 along opposite ends of the stepping panel 13. More particularly, the U-shaped grooves 19 reach a zero depth at the opposite ends of the second bend line 1613 adjacent the second mounting panel 16. Furthermore, the U-shaped grooves 19 are formed so that the edge 18A of the reinforcing flange 18 is at substantially the same height as the surface of the first mounting panel 14 facing up in FIG. 4. As a result, the reinforcing flange 18 will not interfere when the first mounting panel 14 is opposed to the casing 1. Therefore, the rear mounting fitting 4 can be mounted utilizing a wide substantially flat portion of the casing 1.

The rear mounting fitting 4 is required to be stronger than the other two mounting fittings 3, 5. Thus, ribs 20 are provided in addition to the reinforcing flange 18. More particularly, substantially parallel ribs 20A and 20B extend from the first panel 14 to the stepping panel 13 and are disposed symmetrically on opposite respective sides of the crimping holes 15. Additionally, the ribs 20A and 20C extend continuously across the first bend line 1413 substantially perpendicular to the first bend line 1413. The ribs 20A and 20B project down in FIG. 4 and hence their concave sides face up. Accordingly, the ribs 20A and 30B will not affect secure mounting of the upper surface of the first mounting panel 14. A rib 20C extends from the second mounting panel 16 to the stepping panel 13. The rib 20C extends continuously across a middle position on the second bend line 1613 and is substantially perpendicular to the second bend line 1613. Furthermore, the rib 20C project up in FIG. 4 so that the concave side faces down. Thus, the rib 20C will not affect the secure mounting of the lower surface of the second mounting panel 16. Embossments 20E are provided along the second bend line 1613 between the second mounting panel 16 and the inclined stepping panel 13 for further increasing the strength of the mounting fitting 4.

The middle mounting fitting 5 is arranged in the intermediate position shown in FIG. 1, and is illustrated as a conventional mounting fitting. However, the inventive mounting fitting also can be used in the middle.

An inclined stepping panel 21 is formed at an intermediate position of the middle mounting fitting 5, and a first mounting panel 22 is formed at a lower part thereof in FIG. 1 for mounting on the casing 1. Two crimping holes 23 are formed in the first mounting panel 22 for fixing the middle mounting fitting 5 to the casing 1 as described above with respect to the front and rear mounting fittings 3, 4. A second mounting panel 24 is formed at an upper part of the middle mounting fitting 5 for mounting on the inner panel 2.

Reinforcing flanges 25A, 25B are bent in substantially opposite directions at the first and second mounting panels 22, 24. In other words, the reinforcing flange 25A of the first mounting panel 22 is bent substantially at a right angle in a direction opposite to the casing 1, whereas the reinforcing flange 25B of the second mounting flange 24 is bent substantially at a right angle in a direction substantially opposite to the inner panel 2. Accordingly, the two reinforcing flanges 25A, 25B make cuts 26 at the stepping panel 21. Reinforcing ribs 27 are formed by embossing.

The reinforcing flanges 12, 18 formed on the front and rear mounting fittings 3, 4 are substantially continuous without any cut along their longitudinal directions. Thus, the entire mounting fittings 3, 4 have high strengths and can sufficiently resist even the repeated exertion of forces resulting from the opening and closing of the slide door. Further, the reinforcing flanges 12, 18 are formed along the opposite lateral edges in the longitudinal direction, and also at the U-shaped edges that couple these lateral edges. Thus, the strength can be enhanced further. An area defined by the reinforcing flange could be struck to bulge up to substantially the same height as the edge of the reinforcing flange or to bulge further out as an area of the first mounting panel 14 of the rear mounting fitting 4 defined by the reinforcing flange 18 is struck to bulge up to the substantially same height as the edge 18A of the reinforcing flange 18, and no consideration needs to be made on the interference with the reinforcing flange upon mounting the mounting fitting on the casing 1. Thus, the mounting fitting can be mounted utilizing a wide flat surface of the casing 1.

The invention is not limited to the above described and illustrated embodiment. For example, the following embodiments are also embraced by the technical scope of the present invention as defined by the claims. Beside the following embodiments, various changes can be made without departing from the scope and spirit of the present invention as defined by the claims.

Mounting fittings for the casing 1 of the slide door are shown in the foregoing embodiment. However, an object to be mounted or a fixed mating partner is not limited.

The mounting fittings need not be always fixed to the casing 1 or the inner panel 2 by crimping, and may be fixed by bolting, welding, riveting or other means or a plurality of these means may be used in combination.

The reinforcing flange is long and includes the U-shaped curved portion in the foregoing embodiment. However, it may not have the curved portion provided that it continuously extends without any cut along longitudinal direction at least over the first and second mounting surfaces.

What is claimed is:

1. A mounting fitting formed by bending a metallic plate material and used to mount an object to a fixed member, comprising:
    a first mounting panel to be mounted on the object;
    a second mounting panel to be mounted on the fixed member and defined at a position displaced from the first mounting panel; and
    at least one elongated reinforcing flange extending from the first mounting panel to the second mounting panel (8; 16) and bent so all areas of an edge of the reinforcing flange face substantially in a common direction and are continuous along the reinforcing flange without any cut.

2. The mounting fitting of claim 1, wherein at least a portion of the reinforcing flange is nonplanar and extends from a nonlinear peripheral portion of the second mounting panel.

3. The mounting fitting of claim 2, wherein a stepped panel extends between the first and second mounting panels.

4. The mounting fitting of claim 3, further comprising at least one rib substantially longitudinally provided on at least one of the first mounting panel and the second mounting panel.

5. The mounting fitting of claim 4, wherein the at least one rib comprises ribs extends from a stepping panel to at least one of the first and second mounting panels.

6. The mounting fitting of claim 5, wherein two of the ribs from opposite surfaces of the mounting fitting.

7. The mounting fitting of claim 5, wherein the ribs include a middle rib that extends continuously from the stepped panel to the first mounting panel and at least one rib extending from the stepped panel to the second mounting panel.

8. The mounting fitting of claim 3, further comprising at least one embossment extending across a bend line between the stepped panel and at least one of the first and second mounting panels.

9. The mounting fitting of claim 1, wherein at least one substantially U-shaped groove is formed between the first mounting panel and the reinforcing flange.

10. The mounting fitting of claim 9, wherein the edge on portions of the reinforcing flange adjacent the U-shaped groove is substantially in a common plane with the first mounting panel.

11. A mounting fitting formed from a unitary metallic plate material having opposite first and second surfaces and used to mount an object to a fixed member, comprising:
    a first mounting panel to be mounted on the object;
    a stepped panel joined unitarily to the first mounting panel along a first bend line;
    a second mounting panel to be mounted on the fixed member and joined unitarily to the stepped panel along a second bend line so that said second mounting panel is offset from the first mounting panel; and
    an elongated reinforcing flange bent to project up from the first surface of the metallic plate material and extending continuously along peripheral portions of the first mounting panel, the stepped panel and the second mounting panel.

12. The mounting fitting of claim 11, wherein the first mounting panel is substantially parallel to the second mounting panel.

13. The mounting fitting of claim 12, wherein the first and second mounting panels are substantially perpendicular to the reinforcing flange.

14. The mounting fitting of claim 11, further comprising a U-shaped groove between the first mounting panel and the reinforcing flange.

15. The mounting fitting of claim 14, wherein the reinforcing flange has an edge, the first mounting panel being substantially coplanar with the edge along portions of the reinforcing flange adjacent the U-shaped groove.

16. The mounting fitting of claim 15, further comprising at least one rib in the first mounting panel and having a concave side in the first surface.

17. The mounting fitting of claim 16, further comprising at least one rib in the second mounting panel and having a concave side in the second surface.

18. The mounting fitting of claim 17, wherein the ribs extend onto the stepped panel.

\* \* \* \* \*